(12) United States Patent
Santoro et al.

(10) Patent No.: US 8,391,026 B2
(45) Date of Patent: Mar. 5, 2013

(54) METHOD AND CIRCUIT FOR AVOIDING HARD SWITCHING IN RESONANT CONVERTERS

(75) Inventors: Christian Leone Santoro, Milan (IT); Claudio Adragna, Monza (IT); Aldo Vittorio Novelli, S. Lorenzo Parabiago (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 263 days.

(21) Appl. No.: 12/789,113

(22) Filed: May 27, 2010

(65) Prior Publication Data

US 2010/0259954 A1    Oct. 14, 2010

Related U.S. Application Data

(63) Continuation-in-part of application No. PCT/EP2010/054694, filed on Apr. 9, 2010.

(30) Foreign Application Priority Data

Apr. 9, 2009  (IT) .............. MI2009A0576

(51) Int. Cl.
*H02M 3/335* (2006.01)
(52) U.S. Cl. ........................ 363/16; 363/131
(58) Field of Classification Search .......... 363/17, 363/16, 131
See application file for complete search history.

(56) References Cited

U.S. PATENT DOCUMENTS

| | | | |
|---|---|---|---|
| 5,539,630 A | | 7/1996 | Pietkiewicz et al. |
| 6,018,467 A | * | 1/2000 | Majid et al. ............ 363/16 |
| 6,344,979 B1 | | 2/2002 | Huang et al. |
| 6,836,414 B1 | | 12/2004 | Batarseh et al. |
| 8,174,850 B2 | * | 5/2012 | Adragna et al. ............ 363/17 |
| 2007/0175890 A1 | | 8/2007 | Suenaga et al. |
| 2008/0224677 A1 | | 9/2008 | Kim et al. |
| 2008/0266908 A1 | | 10/2008 | Halberstadt |
| 2009/0207635 A1 | | 8/2009 | Elferich |

FOREIGN PATENT DOCUMENTS

| | | |
|---|---|---|
| JP | 10136647 A | 5/1998 |
| WO | 2009/004582 A1 | 1/2009 |

* cited by examiner

*Primary Examiner* — Shawn Riley
(74) *Attorney, Agent, or Firm* — Seed IP Law Group PLLC

(57) ABSTRACT

A resonant dc-dc converter converts dc input voltage to a dc output voltage. The converter includes switching, switching driving, conversion, and disabling circuits. The switching circuit receives the input voltage and generates a square wave voltage oscillating between the input voltage and a low value, at a frequency with a duty cycle. The switching driving circuit drives the switching circuit and includes a timing circuit for setting the frequency and the duty cycle. The timing circuit sets the value of the duty cycle to about 50% when the converter operates in steady state. The conversion circuit generates the output voltage from the square wave voltage based on the frequency and the duty cycle. The disabling circuit temporarily halts the timing circuit after a power on in such a way to temporarily vary the duty cycle of the square wave voltage during a period of the square wave voltage.

39 Claims, 7 Drawing Sheets

METHOD AND CIRCUIT FOR AVOIDING HARD SWITCHING IN RESONANT CONVERTERS

BACKGROUND

1. Technical Field

The present disclosure relates to the electronics field. Particularly, this solution concerns switching direct current-direct current (dc-dc) converters.

2. Description of the Related Art

In electronics, a dc-dc converter is an electronic circuit adapted to convert a dc voltage value to another one. An important application field of dc-dc converters regards the electronic systems supplied through the power grid. Particularly, such electronic systems generally comprise a front-end circuit capable of generating a dc voltage by rectifying the (alternating) voltage provided by the power grid; however, a generic electronic system is typically formed by a plurality of sub-circuits, each needing a different supply voltage value. The presence of one or more dc-dc converters allows to locally generate said different supply voltage values starting from the one generated by the front-end circuit.

Among the various dc-dc converters presently available on the market, a well-known class thereof is represented by the so-called switching dc-dc converters. A switching dc-dc converter includes one or more switching elements (such as power MOS transistors) that are properly switched for generating a square wave starting from the dc input supply voltage.

The switching frequency of the switching elements is significantly higher than that of the alternating voltage provided by the power grid. Therefore, the transformer included in a switching converter can have a smaller size with respect to that of a transformer designed to be directly fed by the power grid. Moreover, a switching converter is characterized by high efficiency and low heat generation.

However, while operating at higher frequencies allows a considerable reduction in the size of the passive components included in a switching converter, such as the transformers and the filters, a high switching frequency entails an increase of the so-called driving losses and of the so-called switching losses. While driving losses are caused by the electrical power required for switching the switching elements, there are two different types of switching losses. A first type of switching losses is given by the simultaneous presence of current through the switching elements and voltage across their terminals during the switching thereof ("hard switching" condition). The second type of switching losses, typically called capacitive losses, is caused by the parasitic capacitance associated with each switching element, which is discharged on the resistance of the switching element itself while this is activated. Both capacitive and switching losses are proportional to the operating frequency of the switching elements. Capacitive losses are proportional to the squared switched voltage To reduce switching losses and allow high frequency operation, resonant conversion techniques have been widely developed. These techniques provide for processing electrical power in a sinusoidal manner, and controlling the switching elements in such a way to limit the occurrence of hard switching.

Resonant converters operated from the rectified power grid voltage are typically realized using the half-bridge and the full-bridge topologies.

With reference to resonant dc-dc converters implemented according to the so-called half bridge topology (briefly referred to as half-bridge resonant converters), the switching elements include a high-side transistor and a low-side transistor connected in series between the supply circuit providing the supply voltage to be converted and a terminal providing a reference voltage, such as ground. By properly switching said two transistors it is possible to generate a square wave having a high value (assumed when the high-side transistor is activated) corresponding to the supply voltage and a low value (assumed when the low-side transistor is activated) corresponding to the ground. A small dead-time, where both transistors are off, is typically inserted as soon as each transistor turns off.

The same square wave may be generated by using two pairs of switching elements each one arranged according to the half-bridge topology, but driven in phase opposition to each other. Particularly, the high-side transistor of the first pair and the low-side transistor of the second pair are activated simultaneously; similarly, the low-side transistor of the first pair and the high-side transistor of the second pair are activated simultaneously. This topology is generally referred to as full-bridge topology. A resonant converter based on a full-bridge topology is briefly referred to as a full-bridge resonant converter.

In a resonant converter, the square wave, generated with either a half-bridge or a full-bridge topology, is applied to the primary winding of a transformer through a resonant network that includes at least a capacitor and an inductor; the secondary winding of said transformer feeds a rectifier circuit and a filter circuit for providing an output dc voltage. The value of the output dc voltage depends on the frequency of the square wave, whether it gets closer to or further from the resonance frequency of the resonant network. The duty cycle of the square wave is kept at about 50%.

Among the various known configurations of resonant network in resonant converters, the so-called inductor-inductor-capacitor (LLC) configuration is especially suited for those applications in which the value of the dc voltage to be converted is particularly high, such as the one generated through the rectification of the power grid voltage, i.e., in a condition favorable for the occurrence of high capacitive losses. The resonant network of an LLC resonant converter is formed by a series inductor-capacitor (LC) circuit connected between the switching elements and an input of the primary winding of the transformer, and a shunt inductor connected across both the inputs of the primary winding.

With an LLC resonant converter, it is possible to adjust the value of the output dc voltage over wide load and input dc voltage variations with a relatively small variation of the switching frequency. Moreover, the LLC topology allows achieving a Zero Voltage Switching (ZVS) condition—wherein the transistors forming the switching elements switch with a nearly zero drain-to-source voltage—with ease. Particularly, by properly designing the resonant network in such a way that the reactive component of its impedance is inductive for a sufficiently large switching frequency range, the current flowing into the resonant network lags the voltage square wave generated by the switching elements. Referring to the half-bridge topology for simplicity, under this condition, when the high-side transistor turns off the current is still positive (entering into the resonant network). This forces the intermediate node shared by the high-side and the low-side transistors to fall to ground so that the current flows through the body diode of the low-side transistor. When the low-side transistor is switched on after the dead-time, its drain-to-source voltage is essentially zero. Similarly, when the low-side transistor turns off, the current is still negative (coming out from the resonant network). This forces the intermediate node shared by the transistors to rise to the input voltage so that the current flows through the body diode of the high-side transistor. When the high-side transistor is switched on after the dead-time, its drain-to-source voltage is substantially zero. Thus, both the high-side and the low-side transistors are switched on in the ZVS condition.

It has to be appreciated that with an appropriate design of the transformer that couples the resonant network to the output rectifiers, the inductive components of the LLC resonant network can be "integrated" inside the transformer itself, so that no additional physical device is required for the implementation of the series and shunt inductors. In this case, the transformer is referred to as "resonant transformer".

Resonant converters, and particularly those having the half-bridge topology, are affected by a quite serious drawback occurring during the start-up phase. Particularly, in steady state, the voltage across the terminals of the capacitor included in the resonant network comprises a dc component, corresponding to about half the supply voltage provided by the supply circuit, and an ac component that follows the course in time of the square wave. Since the capacitor blocks the dc component of such voltage, the voltage across the primary winding of the transformer exhibits the ac component only; as a consequence, in steady state, the value of the magnetic flux linking the primary winding with the secondary winding of the transformer oscillates within a symmetrical range defined by such ac component only. On the contrary, at the start-up of the converter, the capacitor is discharged; thus, when the high-side transistor switches on for the first time, the voltage seen by the primary winding is substantially equal to the input supply voltage. In the subsequent semi-period of the square wave, when the low-side transistor is switched on, the voltage seen by the primary winding is the one developed across the resonant capacitor, which is still low. Consequently, when the high-side transistor is turned on for the first time, the current flowing into the resonant network increases more rapidly than it decreases when the low-side transistor is turned on in the subsequent semi-period. When the low-side transistor is turned off again, the current is still flowing through the body diode of the low-side transistor itself; when the high-side transistor is turned on in the subsequent cycle, a reverse voltage is developed across the body diode of the low-side transistor while the latter transistor is still conducting. In this condition, the high-side transistor is switched on in a hard switching condition, with a large current flowing theretrough until the body diode of the low-side transistor is recovered. As a consequence, the high-side and the low-side transistors results to be conductive at the same time (shoot-through condition), thus short-circuiting the terminal providing the supply voltage to be converted with the terminal providing the ground voltage until the recovery of the body diode is over. In this condition, in addition to the high peak of current, which wastes a high amount of instantaneous power, the voltages across the terminals of the transistors may rapidly vary at such a rate that the parasitic silicon-controlled rectifiers (SCRs) inherent in the structure of the transistors may be triggered, thus originating a permanent shoot-through condition capable of causing the destruction of the transistors in few microseconds.

In a converter having the full-bridge topology, since there is no dc voltage across the capacitor included in the resonant network, the above mentioned start-up issue is much less severe, but not excluded.

BRIEF SUMMARY

One embodiment avoids (or at least reduces) any occurrence of hard switching during the start-up operation of a resonant converter, with special emphasis on the resonant converters having the half-bridge topology.

Particularly, one embodiment provides a resonant dc-dc converter for converting an input dc voltage to an output dc voltage. The converter includes a switching circuit for receiving the input dc voltage and generating a periodic square wave voltage oscillating between a high value corresponding to the input dc voltage and a low value corresponding to a fixed voltage. The square wave voltage oscillates at a main frequency with a main duty cycle. The converter further includes a switching driving circuit for driving the switching circuit. The switching driving circuit includes a timing circuit for setting the main frequency and the main duty cycle of the square wave voltage. The timing circuit is configured to set the value of the main duty cycle to about 50% when the converter operates in steady state. The converter includes a conversion circuit based on a resonant circuit for generating the output dc voltage from the square wave voltage based on the main frequency and on the main duty cycle. The converter further includes a disabling circuit for temporarily halting the timing circuit after a power on of the converter in such a way to temporarily vary the main duty cycle of the square wave voltage during at least one period of the square wave voltage.

One embodiment provides for a method for operating a resonant dc-dc converter.

BRIEF DESCRIPTION OF THE SEVERAL VIEWS OF THE DRAWINGS

The disclosure according to one or more embodiments of the present disclosure, as well as further features and advantages thereof will be best understood by reference to the following detailed description, given purely by way of a non-restrictive indication, to be read in conjunction with the accompanying drawings. Particularly.

DETAILED DESCRIPTION

In the following, a solution according to exemplary and non-limitative embodiments of the present disclosure will be presented and described in detail. Those skilled in the art will however recognize that several modifications to the described embodiments are possible, and that the present disclosure can be embodied in different ways.

Figure 1:
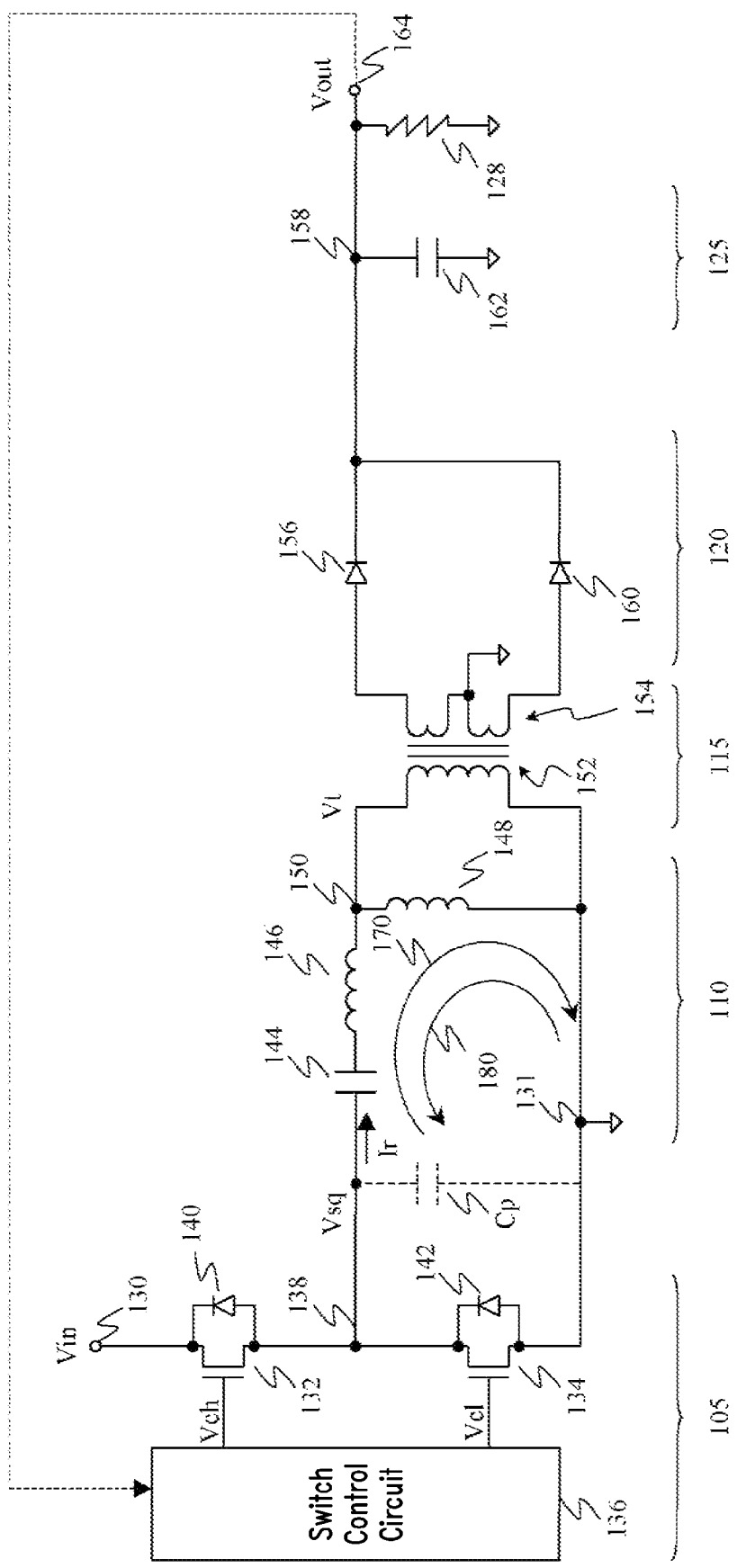
FIG. 1 illustrates a resonant dc-dc converter in which the concepts of the present disclosure may be applied.

With reference in particular to FIG. 1, an exemplary switching dc-dc converter in which the concepts of the present disclosure may be applied is illustrated with the reference 100. The converter 100 illustrated in FIG. 1 is an LLC resonant converter of the half-bridge type; however, it has to be appreciated that similar considerations apply to other possible resonant configurations—such as LC and LCC —as well as to a resonant converter of the full-bridge type.

The converter 100 includes five main cascaded sections, and particularly a square wave generator 105, an LLC resonant network 110, a transformer 115, a rectifier 120 and a filter 125.

The converter 100 receives an input dc voltage Vin to be converted, and provides a corresponding converted output dc voltage Vout. For example, the input dc voltage may be generated by a supply circuit (not shown) from an ac voltage provided by the power grid. The converted output voltage Vout is provided to a generic load schematically represented by a resistor 128.

The square wave generator includes two switching elements connected in series between an input terminal 130 receiving the input dc voltage Vin and a reference node 131 coupled with a terminal providing a reference voltage, referred to as ground. Particularly, the switching elements comprise a high-side transistor 132 (e.g., an n-channel power MOS transistor) and a low-side transistor 134 (e.g., another n-channel power MOS transistor). The high-side transistor 132 includes a drain terminal coupled with the input terminal 130 for receiving the input dc voltage Vin, a gate terminal coupled with a switching control circuit 136 for receiving a control signal Vch, and a source terminal connected to a drain terminal of the low-side transistor 134 (circuit node 138). The low-side transistor 134 includes a gate terminal coupled with the switching control circuit 136 for receiving a control signal Vcl and a source terminal connected with the reference node 131. Both the high-side and low-side transistors 132 and 134 are depicted in FIG. 1 with their intrinsic body diodes. Particularly, the high-side transistor 132 comprises a body diode identified with the reference 140, which is coupled between the source terminal (anode) and the drain terminal (cathode) thereof; similarly, the low-side transistor 134 comprises a body diode 142 coupled between the source terminal (anode) and the drain terminal (cathode).

The resonant network 110 comprises a resonant capacitor 144, which acts as a dc blocking capacitor as well, having a first terminal connected to the circuit node 138 and a second terminal connected to a first terminal of a (series) inductor 146. The inductor 146 has a second terminal connected to a first terminal of a further (shunt) inductor 148 (circuit node 150); the inductor 148 has a second terminal connected to the reference node 131. Similar considerations apply in case one or both of the inductors 146 and 148 are replaced by parasitic inductances that are intrinsic to the transformer 115.

The transformer 115 includes a primary winding 152 having a first terminal connected to the circuit node 150 and a second terminal connected to the reference node 131. The transformer 115 further comprises a center-tapped secondary winding 154, having a first and a second terminal connected to the rectifier 120 and a center tap connected to a terminal providing the ground voltage.

The rectifier 120 comprises a diode 156 having a first terminal (anode) connected to the first terminal of the secondary winding 154 and a second terminal (cathode) connected to the filter 125 (circuit node 158). The rectifier 120 comprises a further diode 160 having a first terminal (anode) connected to the second terminal of the secondary winding 154 and a second terminal (cathode) connected to the circuit node 158.

It is worth noticing that the concepts of the present disclosure can be also applied to different secondary winding 154 and/or rectifier block 120 configurations.

The filter 125 in FIG. 1 is implemented by means of a capacitor 162 having a first terminal connected to the circuit node 158 and a second terminal connected to a terminal providing the ground voltage.

The circuit node 158 is connected to the output terminal of the converter 100—identified in the figure with the reference 164—for providing the converted output voltage Vout to the load 128.

Without entering into details well known to those skilled in the art, the principle of operation of the converter 100 will be described in the following.

Figure 2:
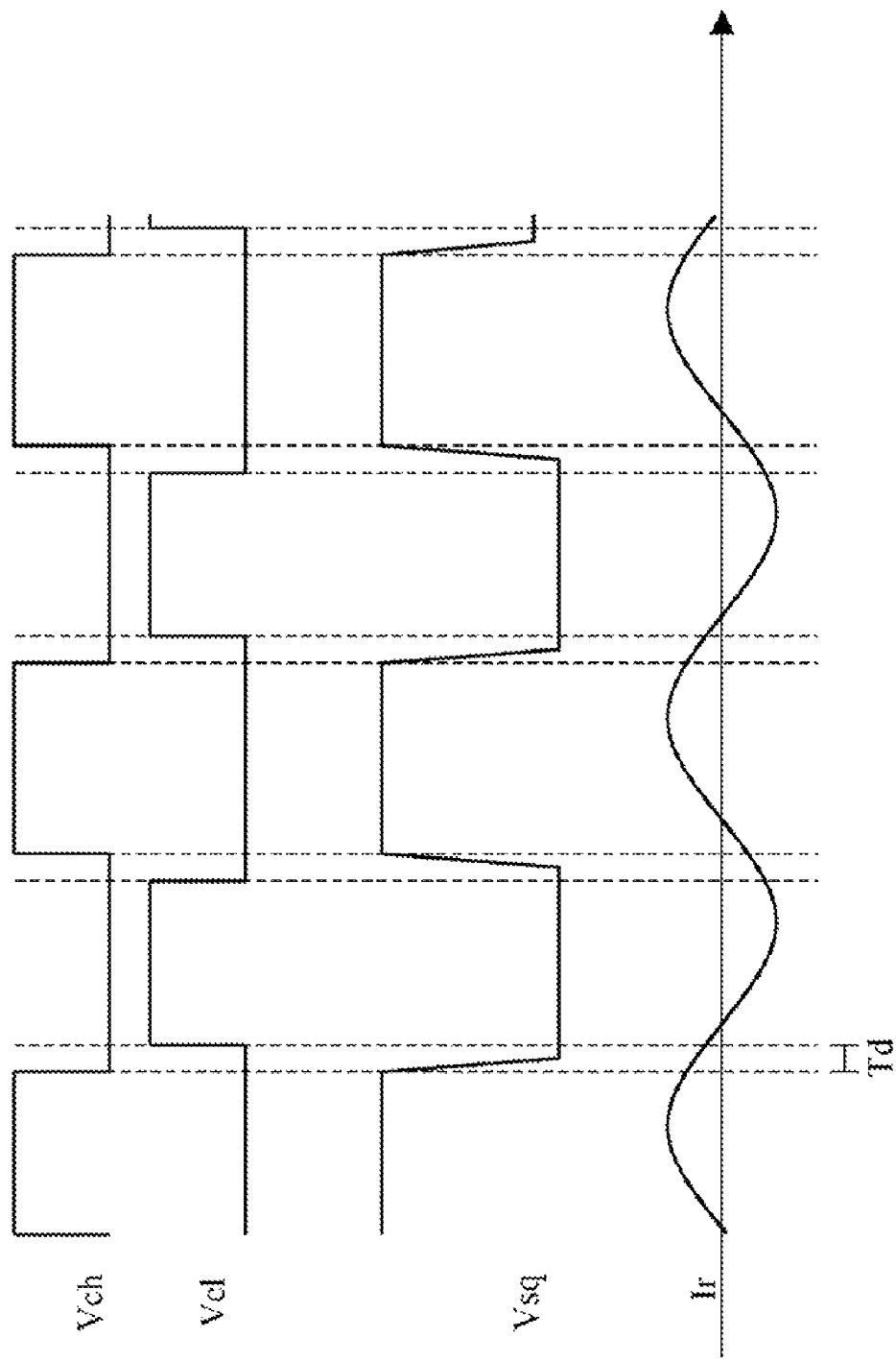
FIG. 2 illustrates an example of how some signals of the converter illustrated in FIG. 1 evolve in time.

The switching control circuit 136 drives the high-side and low-side transistors 132, 134 in such a way to activate/deactivate them in a symmetrical way. For this purpose, the control signals Vch and Vcl generated by the switching control circuit 136 are periodic square waves in antiphase. More particularly, as it is shown in the example illustrated in FIG. 2, the control signals Vch and Vcl are periodic square waves oscillating between a high value and a low value at a same switching frequency sf with a duty cycle (i.e., the ratio between the duration in time the control signals are at the high value and the duration in time the control signals are at the low value) of about 50%. The control signals Vch and Vcl are in antiphase, in the sense that when one of them it is at the high value, the other one is at the low value. When the control signal Vch is at the high value and the control signal Vcl is at the low value, the high-side transistor 132 is activated, while the low-side transistor 134 is off. In this situation, the circuit node 138 is brought to the input dc voltage Vin. When instead the control signal Vcl is at the high value and the control signal Vch is at the low value, the low-side transistor 134 is activated, while the high-side transistor 132 is off. In this case, the circuit node 138 is brought to the ground voltage. As a consequence, the voltage of the circuit node 138, referred to as square input voltage and identified in the figures with the reference Vsq, is a square wave that oscillates in phase with the control signal Vch between a high value corresponding to the input dc voltage Vin and a low value corresponding to the ground voltage. By setting the duty cycle of both the control signals Vch and Vcl to about 50%, the average value of the square input voltage Vsq is equal to about half the input dc voltage Vin.

As will be clearer in the following of the present description, in order to allow the converter 100 to correctly operate in the ZVS condition, both the control signals Vch and Vcl are set to the low value after each falling edge thereof for a predetermined time interval. During such predetermined time intervals, referred to as dead-times and identified in FIG. 2 with the reference Td, both the high-side and the low-side transistors 132, 134 are turned off.

The square input voltage Vsq is applied to the terminal of the capacitor 144 connected to the circuit node 138. In steady state, the voltage difference developed across the terminals of the capacitor 144 is formed by a dc component equal to the average value of the square input voltage Vsq plus an ac component oscillating at the switching frequency sf. Without entering into details well known to the skilled technicians, the resonant network 110 and the primary winding 152 of the transformer 115 act as a voltage divider for such ac component; as a consequence, the amplitude of the (ac) voltage at the circuit node 150 —referred to as transformer input voltage Vt-depends on the reactance of the resonant network 110, which depends in turn by the switching frequency sf of the square input voltage Vsq. The transformer input voltage Vt applied to the primary winding 152 generates a corresponding transformed (ac) voltage across the terminals of the secondary winding 154, whose amplitude depends on the transformer turns ratio (i.e., the ratio between the number of turns in the primary winding and the number of turns in the secondary winding). Said ac voltage is rectified by the rectifier 120 and filtered by the filter 125 for obtaining a converted output dc voltage Vout of the desired level.

By varying the switching frequency sf of the square input voltage Vsq, it is possible to regulate the value of the output dc voltage Vout. Indeed, the amplitude of the transformer input voltage Vt depends on the switching frequency sf, more importantly, the lower the switching frequency sf of the square input voltage Vsq, the higher the amount of energy that is transferred from the primary winding 152 to the secondary winding 154 during each period of the square input voltage Vsq.

For this purpose, in order to maintain the output dc voltage Vout at the desired level also in presence of load 128 variations and/or input dc voltage Vin fluctuations, the output dc voltage Vout is fed back to the switching control circuit 136. The switching control circuit 136 is designed to vary the switching frequency sf of the square input voltage Vsq based on the output dc voltage Vout changes due to the load 128 variations and/or input dc voltage Vin fluctuations, and particularly by increasing the switching frequency sf when the input dc voltage Vin increases and the load 128 resistance decreases (and vice versa).

As previously cited in the present description, the capacitance of the capacitor 144 and the inductances of the inductors 146, 148 are such that the reactance of the resonant network 110 is inductive for the switching frequencies sf for which the converter 100 is designed to operate. In this way, the current flowing into the resonant network—identified in the FIGS. 1 and 2 with the reference Ir—is ensured to lag the square input voltage Vsq (and thus, the control signal Vch). This condition, together with the presence of the dead-times Td after each falling edge of the control signals Vch and Vcl, allows the high-side and low side transistors 132, 134 to switch in a ZVS condition.

In greater detail, when the high-side transistor 132 is on, the square input voltage Vsq is at the input dc voltage Vin. In this condition, the parasitic capacitance associated with the circuit node 138—identified in FIG. 1 by means of a single lumped capacitor Cp, but formed by the intrinsic capacitances of the high-side and low side transistors 132, 134—is charged to the input dc voltage Vin. For the reasons previously described, when the high-side transistor 132 switches off at the falling edge of the control signal Vch, the direction of the current Ir is inward the resonant network 110, as illustrated in FIG. 1 by means of the arrow identified with the reference 170. This current Ir is initially supplied by the capacitor Cp, and particularly by the electric charge stored in the "plate" thereof that is connected to the circuit node 138. If the dead-time Td is sufficiently long, the voltage of the circuit node 138 decreases until it is clamped by the body diode 142 to (approximately) the ground voltage; therefore, the current Ir starts to flow through the body diode 142 itself. In this way, at the rising edge of the control signal Vcl, the low-side transistor 134 is turned on with a nearly zero drain-to-source voltage (ZVS condition).

Similarly, when the low-side transistor 134 switches off at the falling edge of the control signal Vcl, the direction of the current Ir is outward the input resonant network 110, as illustrated in FIG. 1 by means of the arrow identified with the reference 180. Thus, the current Ir initially charges the "plate" of the capacitor Cp which is connected to the circuit node 138. Thus, if the dead-time Td is sufficiently long, the voltage of the circuit node 138 rises until it is clamped by the body diode 140 to (approximately) the input dc voltage Vin; therefore, the current Ir starts to flow through the body diode 140. In this way, at the rising edge of the control signal Vch, the high-side transistor 132 is turned on with a nearly zero drain-to-source voltage (ZVS condition).

Figure 3:
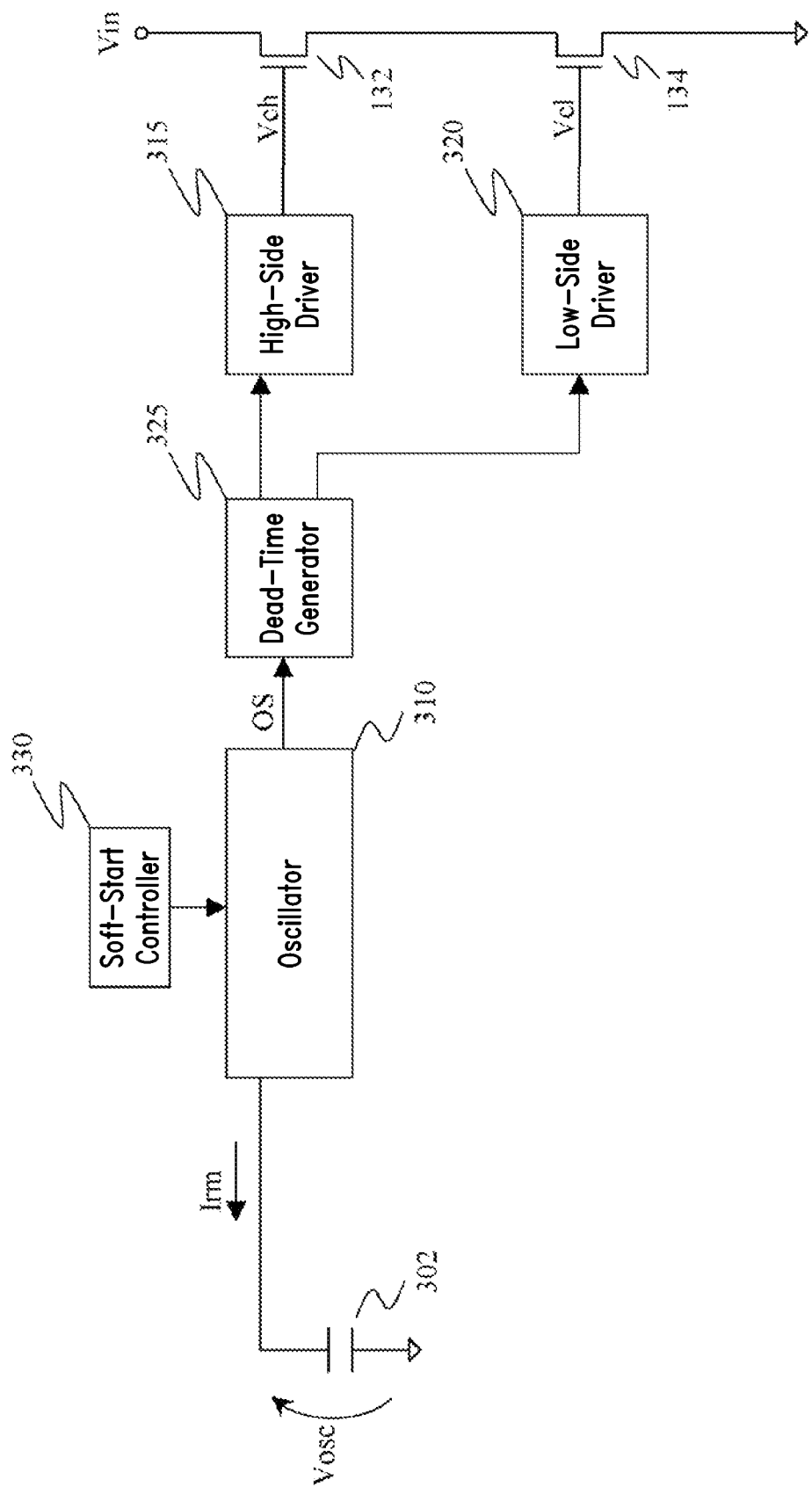
FIG. 3 illustrates the main components of a switching control circuit included in the converter of FIG. 1 according to an exemplary solution known in the art.

With reference to FIG. 3, the main components of a switching control circuit are schematically illustrated according to an exemplary solution known in the art.

Figure 4:
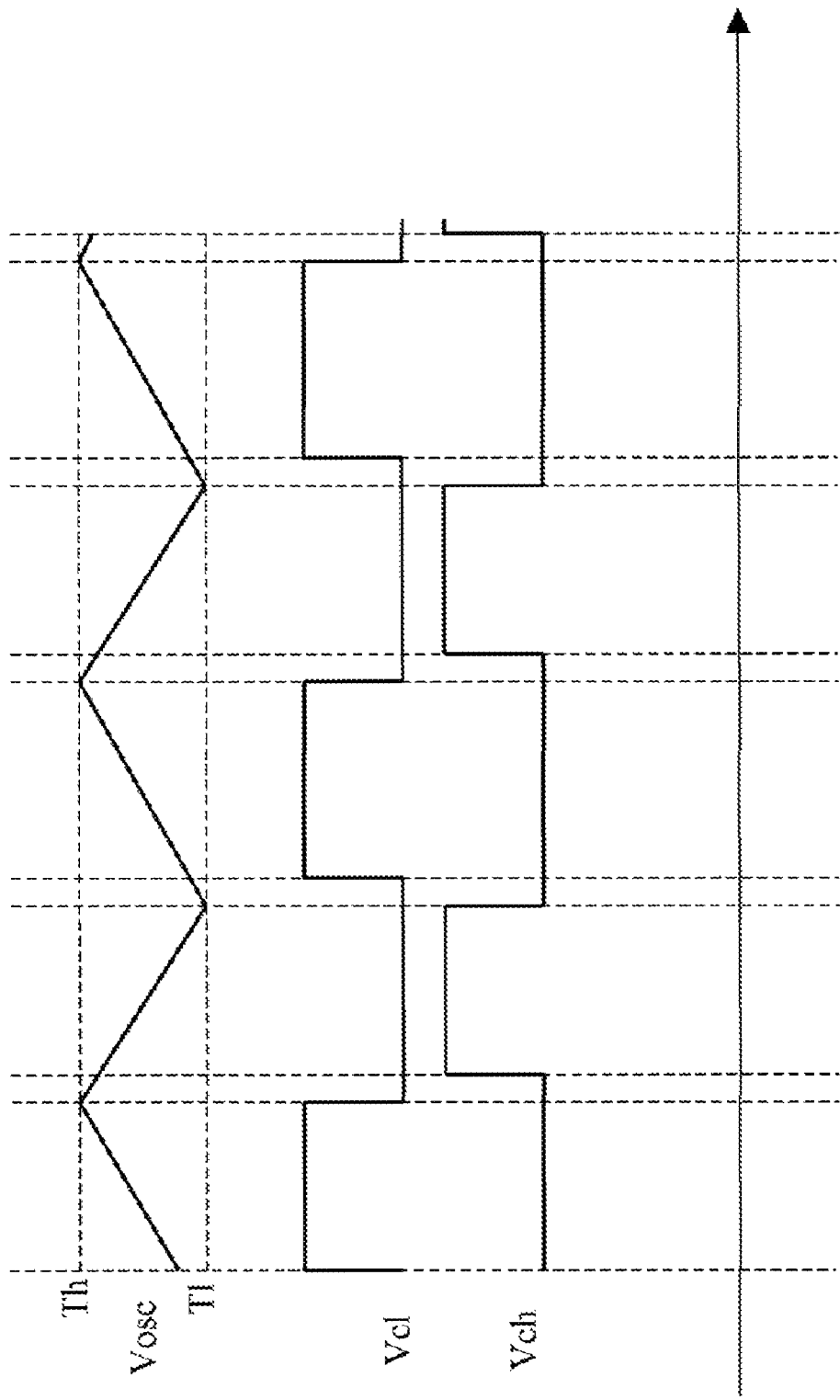
FIG. 4 illustrates an example of how some signals of the converter of FIG. 1 and of the switching control circuit of FIG. 3 evolve in time.

The control signals Vch and Vcl are generated by the switching control circuit exploiting the voltage Vosc that develops across the terminals of a capacitor 302 when it is charged/discharged by means of a constant current Irm. Particularly, the capacitor 302 is alternately charged/discharged by alternately changing the direction of the charging current Irm, in such a way that the voltage Vosc developed across the capacitor 302 is a periodic triangle wave; such triangle wave is used as a basis for generating the control signals Vch, Vcl. For example, as it is shown in FIG. 4, during the rising ramps of the voltage Vosc the control signal Vch is set to the low value, while the control signal Vcl is set to the high value; conversely, during the falling ramps of the voltage Vosc, the control signal Vch is set to the high value, while the control signal Vcl is set to the low value. Similar considerations apply in the opposite case, wherein during the rising ramps of the voltage Vosc the control signal Vch is set to the high value and the control signal Vcl is set to the low value, and during the falling ramps of the voltage Vosc the control signal Vch is set to the low value and the control signal Vcl is set to the high value. It has to be appreciated that by varying the value of the charging current Irm, it is possible to vary the speed with which the capacitor 302 is charged/discharged, and thus the periods of the periodic control signals Vcl and Vch. More particularly, the higher the charging current Irm, the higher the slope of the rising/falling edges of the voltage Vosc. Moreover, the higher the slope of the rising/falling edges of the voltage Vosc, the shorter the periods of the control signal Vcl and Vch. In other words, the switching frequency sf of the control signals Vch and Vcl is directly proportional to the value of the charging current Irm.

Referring back to FIG. 3, the switching control circuit includes a timing circuit comprising a controlled oscillator 310 which has the purpose of generating the charging current Irm to be provided to the capacitor 302, and outputting a corresponding oscillator state signal OS, whose value determines the values of the control signals Vch and Vcl. During the normal operation (steady state) of the converter 100, the value of such charging current Irm is constant, while the direction thereof is dynamically determined by the controlled oscillator 310. Particularly, when the charging current Irm is positive, in the sense that it is sourced to the capacitor 302, the voltage Vosc linearly increases with a slope determined by the charging current Irm value. As soon as the voltage Vosc reaches a predetermined high threshold, identified in FIG. 4 with the reference Th, the oscillator state signal OS is set to a high value (e.g., corresponding to the logic value "1"). At this point, the controlled oscillator 310 reverses the direction of the charging current Irm, in such a way that the charging current Irm is sunk from the capacitor 302, so that the voltage Vosc linearly decreases with a slope determined by the charging current Irm value. As soon as the voltage Vosc reaches a predetermined low threshold, identified in FIG. 4 with the reference Tl, the oscillator state signal OS is set to a low value (e.g., corresponding to the logic value "0"), and the direction of the charging current Irm is reversed again, in such a way to be sourced to the capacitor 302 for determining a increase in the voltage Vosc (i.e., a further rising ramp is initiated). The controlled oscillator 310 is coupled with a high-side driver 315 and a low side driver 320, which generate the control signals Vch and Vcl based on the value assumed by the oscillator state signal OS. Particularly, when the oscillator state signal OS is at the logic value 1, the control signal Vch is set to the high value, while the control signal Vcl is set to the low value. In this condition, the high-side transistor 132 is activated, while the low-side transistor 134 is turned off. Instead, when the oscillator state signal OS is at the logic value 0, the control signal Vch is set to the low value, while the control signal Vcl is set to the high value. In this condition, the high-side transistor 132 is turned off, while the low-side transistor 134 is activated. To generate the dead-times Td after each falling edge of the control signals Vcl, Vch, the switching control circuit is provided with a dead-time generator circuit 325, which properly delays the oscillator state signal OS generated by the controlled oscillator 310 before it is provided to the high-side driver 315 and to the low side driver 320.

The switching control circuit further comprises a soft-start control circuit 330 adapted to control the operation of the converter 100 for gradually increasing the amount of energy that is transferred from the primary winding 152 to the secondary winding 154 of the transformer 115 during the start-up of the converter 100. Particularly, since the amount of energy that is transferred from the primary winding 152 to the secondary winding 154 during each period of the square input voltage Vsq increases as the switching frequency sf decreases, the soft-start control circuit 330 sets the switching frequency sf to a high value at converter's power on, and progressively decreases said value during the subsequent periods.

For this purpose, the soft-start circuit 330 drives the controlled oscillator 310 in such a way to increase the value of the charging current Irm (thus increasing the switching frequency sf) at the start-up of the converter 100, and then progressively decrease said value (thus decreasing the switching frequency sf).

Even if not explicitly illustrated in FIG. 3, the controlled oscillator 310 is further configured to sense the output dc voltage Vout from the output terminal 164 of the converter 100 (see FIG. 1) for accordingly regulating the amplitude of the charging current Irm once the converter has reached its steady state operation.

As previously mentioned, when the converter 100 is in steady state, the voltage across the capacitor 144 comprises a dc component-corresponding to about half the input dc voltage Vin—and an ac component that follows the course in time of the square input voltage Vsq. Since the capacitor 144 blocks the dc component of such voltage, the primary winding 152 of the transformer 115 "sees" the ac component only; as a consequence, in steady state, the value of the magnetic flux linking the primary winding 152 with the secondary winding 154 oscillates within a symmetrical range defined by such ac component only.

On the contrary, at the start-up of the converter 100, the capacitor 144 is discharged; thus, when the high-side transistor 132 is activated for the first time (first semi-period of the square input voltage Vsq), the circuit node 138 reaches a voltage approximately equal to the input dc voltage Vin. Being the capacitor 144 completely discharged, the voltage of the circuit node 138 is provided to the terminal of the inductor 146 connected to the capacitor 144. Since at the start-up of the converter 100 the voltage of the circuit node 150 is essentially equal to the ground voltage (because the output dc voltage Vout is equal to the ground voltage, too), the whole input voltage Vin develops across the inductor 146 terminals. In this condition, the current Ir increases with a relatively high rate.

When the high-side transistor 132 is turned off, and the low-side transistor 134 turns on after the dead-time Td (second semi-period of the square input voltage Vsq), the circuit node 138 is brought to the ground voltage. At that moment, the capacitor 144 is storing a small amount of electric charge, collected during the previous semi-period of the square input voltage Vsq. Said small amount of electric charge develops a relatively small voltage difference across the terminals of the capacitor 144 (with the terminal connected to the circuit node 138 that is at a higher potential with respect to the other one). Being the voltage of node 150 at zero, this small voltage difference is directly applied across the terminals of the inductor 146. Since the node 138 is at the ground voltage, the inductor 146 sees the abovementioned voltage difference as negative. Therefore, the current Ir decreases, but with a relatively low rate, and particularly with a rate lower than the one the current Ir was increasing with during the previous semi-period of the square input voltage Vsq.

As set by the control circuit, the low-side transistor 134 is kept in the on-state for the same time as the high-side transistor 132 in the previous semi-period. Therefore, when the low-side transistor 134 turns off at the falling edge of the control signal Vcl the current Ir is still positive and flows through the body diode 142. In this way, as soon as the high-side transistors 132 is turned on again, a negative voltage is applied across the body diode 142 while it is still conducting. Therefore, the body diode 142 needs to be recovered. In this condition, the high-side transistor 140 is switched on in a hard switching condition, with a large current flowing through it until the body diode 142 of the low-side transistor 134 is recovered. As a consequence, the high-side and the low-side transistors are conductive at the same time (shoot-through condition), thus short-circuiting the terminal 130 providing the supply voltage to be converted with the terminal 131 providing the ground voltage until the recovery of the body diode 142 is over. In this condition, in addition to the generation of a high peak of current, which wastes a high amount of instantaneous power, the voltages across the terminals of the transistors may rapidly vary at a rate such that the parasitic SCRs inherent in the structure thereof may be triggered, thus originating a permanent shoot-through condition that is capable of bringing both the transistors 132 and 134 to destruction in a few microseconds.

In the following cycles of the square input voltage Vsq, the capacitor 144 is progressively charged, so that the imbalance of the voltage applied to the inductor 146 during the conduction of the low-side and the high-side transistors tends to disappear, until a charge corresponding to a voltage difference of about half the input dc voltage Vin is stored into the capacitor 144 itself. When this condition is reached, the current Ir symmetrically oscillates between a positive and a negative value.

In order to avoid (or at least reduce) any occurrence of hard switching during the start-up of the converter 100, the switching control circuit 136 according to one embodiment of the present disclosure provides for changing the duty cycle of the high-side and low-side transistors 132, 134 by temporarily halting the controlled oscillator 310 based on the direction of the current Ir flowing in the resonant network 110. Particularly, according to an embodiment of the present disclosure shown in FIG. 5, the controlled oscillator 310 is temporarily halted based on the current Ir in such a way that the charging/discharging of the capacitor 302 included in the switching control circuit 136 is conditioned to the direction of the current Ir.

The solution according to an embodiment of the present disclosure provides that the controlled oscillator 310 is halted after every switching of the half bridge (i.e., whenever either Vch or Vcl goes low) until the current Ir has changed direction. Precisely, before activating the low-side transistor 134 it is waited for the current Ir to became positive (i.e., with the direction thereof that is inward the input resonant network 110); similarly, before activating the high-side transistor 132 it is waited for the current Ir to became negative (i.e., with the direction thereof that is outward the input resonant network 110).

For this purpose, according to an embodiment of the present disclosure the switching control unit previously described with reference to FIG. 3 is modified in the following way.

Figure 5:
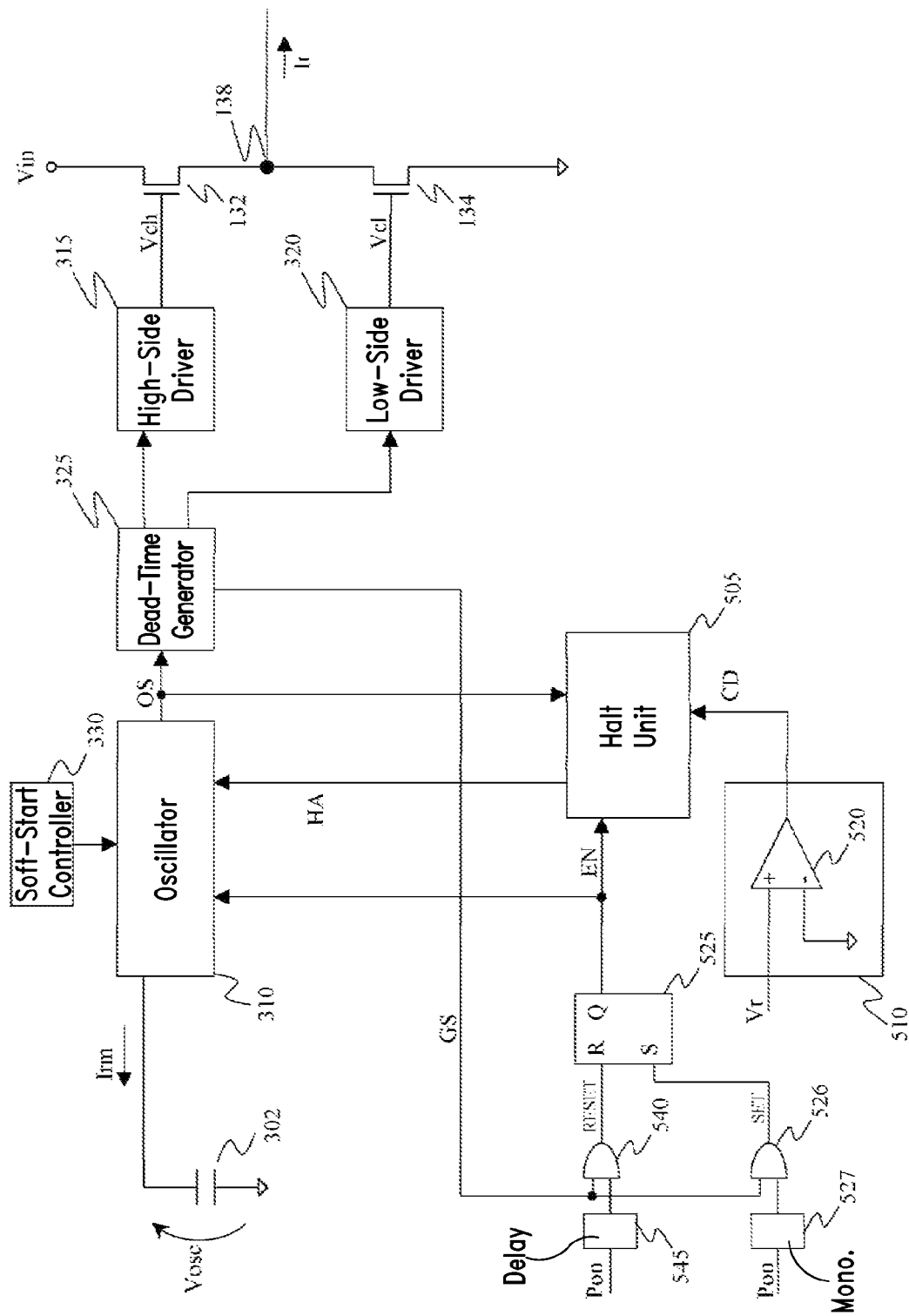
FIG. 5 illustrates the main components of the switching control circuit included in the converter of FIG. 1 according to an embodiment of the present disclosure.

Particularly, with reference to FIG. 5, the main components of the switching control circuit 136 are schematically illustrated according to an embodiment of the present disclosure. The elements corresponding to those shown in the FIG. 3 are denoted with the same references, and their explanation is omitted for the sake of brevity.

According to an embodiment of the present disclosure the switching control circuit 136 further includes an oscillator halt unit 505, which is adapted to temporarily halt the operation of the controlled oscillator 310 during the start-up of the converter 100 according to the current Ir. The oscillator halt unit 505 drives the controlled oscillator 310 through a halt signal HA, whose value determines when the controlled oscillator 310 is halted. When the halt signal HA is deasserted (e.g., to a low voltage value) by the oscillator halt unit 505, the controlled oscillator 310 is left to operate normally, with the capacitor 302 that is charged/discharged by the charging current Irm, and the voltage Vosc that is accordingly varied. On the contrary, when the halt signal HA is asserted (e.g., to a high voltage value) by the oscillator halt unit 505, the operation of the controlled oscillator 310 is halted, in such a way that the value of the voltage Vosc is maintained constant. For example, when the halt signal HA is asserted, the charging current Irm generated by the controlled oscillator 310 is zeroed, interrupting any charge/discharge of the capacitor 302. Since the oscillations in time of the voltage Vosc determine the values assumed by the oscillator state signal OS over the time, maintaining the voltage Vosc at a constant value for a certain time allows to vary the duty cycles of the control signals Vch and Va. Particularly, as described in the following of the present description, during at least a portion of the converter's 100 start-up, the oscillator halt unit 505 drives the controlled oscillator 310 in such a way that the duty cycles of the control signals Vch and Vcl are modified so as to avoid that the high-side and low-side transistors 132, 134 perform a hard switching.

The oscillator halt unit 505 is coupled with the controlled oscillator 310 for receiving the oscillator state signal OS, and to a sense circuit—identified in FIG. 5 with the reference 510—for receiving a current direction signal CD whose value is indicative of the direction assumed by the current Ir flowing in the resonant network 110. For example, when the current Ir is positive (meaning that its direction is inward the input resonant network 110), the direction signal CD is asserted (e.g., to a high voltage value) by the sense circuit 510; on the contrary, when the current Ir is negative (meaning the its direction is outward the input resonant network), the direction signal CD is deasserted (e.g., to a low voltage value) by the sense circuit 510.

According to an embodiment of the present disclosure, the sense circuit 510 may be implemented by means of a comparator 520 having a positive input for receiving a sense voltage Vr whose value is proportional to the current Ir, a negative input terminal coupled to a terminal providing a reference voltage (such as the ground voltage), and an output terminal for providing the direction signal CD.

The oscillator halt unit 505 can be selectively enabled/disabled through an enable signal EN. Particularly, the enable signal EN is asserted (e.g., to a high voltage value) after the power on of the converter 100 for allowing the halt unit 505 to operate during the start-up of the converter 100, and is deasserted (e.g., to a low voltage value) after a predetermined time period for disabling the operation of the halt unit 505 and allowing the controlled oscillator 310 to normally operate after the start-up.

Since at the power on of the converter 100 the current Ir is substantially equal to zero, the comparator 520 would not be capable of discriminating the direction thereof. Thus, according to an embodiment of the present disclosure, the oscillator halt unit 505 is enabled (i.e., the enable signal EN is asserted) only once the current Ir has reached a value that is substantially different than zero, so as to allow the controlled oscillator 310 to operate independently from the current Ir during the period in which the direction of the latter is uncertain. For this purpose, according to an embodiment of the present disclosure, instead of asserting the enable signal EN immediately after the power on of the converter 100, the enable signal EN is asserted during the first dead-time Td occurring after the first falling edge of the control signal Vch.

According to an embodiment of the present disclosure the enable signal EN is generated by a set-reset latch 525. Particularly, the latch 525 has a set terminal for receiving a set signal SET, a reset terminal for receiving a reset signal RESET, and an output terminal providing the enable signal EN.

In order to correctly assert the enable signal EN to the high value at the first dead-time Td occurring after the first falling edge of the control signal Vch for activating the halt unit 505, the set signal SET is generated by an AND logic gate 526 having a first input terminal for receiving a signal GS and a second input terminal connected to an output terminal of a monostable element 527 receiving a power on signal Pon. The signal GS is asserted to the high value by the dead-time generator circuit 325 during the dead-times Td. At the power on of the converter 100, the power on signal Pon is asserted to a high value; thus the monostable element 527 sets the second input terminal of the AND logic gate 526 to the high value, too. As soon as the first dead-time Td occurs (i.e., after the first falling edge of the control signal Vch), the signal GS is asserted to the high value, setting thus the set signal SET to the high value for asserting the enable signal EN to the high value (and enabling the halt unit 505).

Then, after a predetermined time period T, the reset signal RESET is asserted to the high value, in such a way that the enable signal EN is deasserted to the low value for disabling the halt unit 505.

In order to correctly synchronize the disabling of the halt unit 505 with the switching of the high-side and low-side transistors 132, 134, according to an embodiment of the present disclosure the latch 525 can be reset only during the dead-times Td determined by the dead-time generator circuit 325. For this purpose, the reset signal RESET is generated by an AND logic gate 540 having a first input terminal connected to the dead-time generator 325 for receiving the signal GS and a second input terminal for receiving the power on signal Pon delayed by the predetermined time period T. The power on signal Pon is properly delayed by means of a delay element 545 coupled to the second terminal of the AND logic gate 540.

In this way, the halt unit 505 is correctly disabled after the expiration of the time period T only during the dead-times Td.

Figure 6:
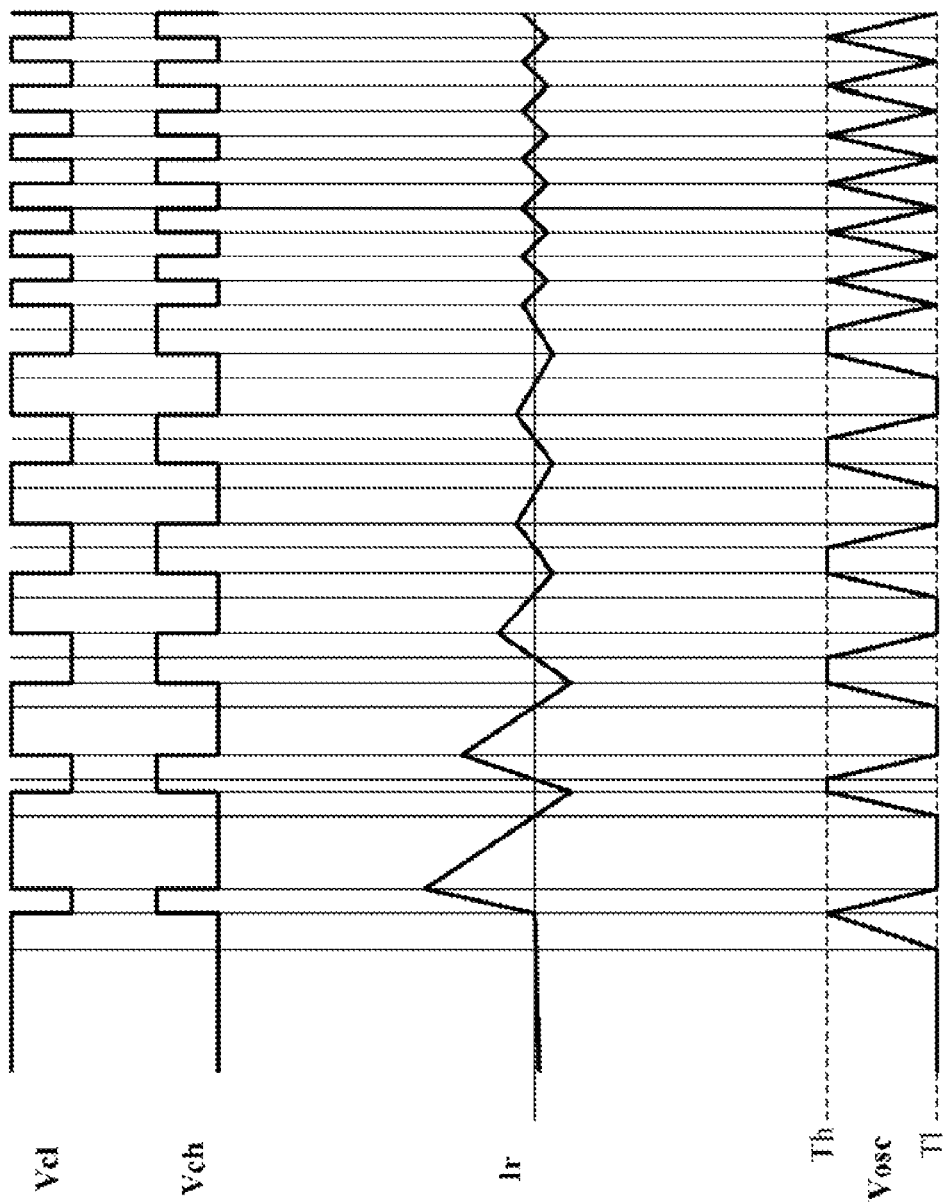
FIG. 6 illustrates the behavior of some signals of the converter illustrated in FIG. 1 during the start-up thereof when the switching control circuit is the one illustrated in FIG. 5.

The operation of the oscillator halt unit 505 will be now described in greater detail with reference to FIG. 5 together with the exemplary time diagram illustrated in FIG. 6. It has to be appreciated that in the time diagram illustrated in FIG. 6 the dead-times Td are set to zero for the sake of the simplicity.

At the power on of the converter, the voltage Vosc across the capacitor 302 is zero, and the oscillator state signal OS is at the low value. In this condition, the low-side transistor 134 is activated (control signal Vcl at the high value) and the high-side transistor is turned off (control signal Vch at the low value). Ir is substantially equal to zero.

At the power on of the converter 100 the oscillator halt unit 505 is turned off (enable signal EN deasserted to the low value), so that the controlled oscillator 310 operates normally, with the charging current Irm that is sourced to the capacitor 302 in such a way to increase the voltage Vosc.

When the voltage Vosc reaches the high threshold Th, the controlled oscillator 310 asserts the oscillator state signal OS to the high value. Therefore, the control signal Vcl is driven to the low value and the control signal Vch is driven to the high value, in such a way that the high-side transistor 132 is activated and the low-side transistor 134 is turned off. In this condition, the current Ir immediately assumes a positive value (entering into the resonant network 110), starting to increase.

At this point, the charging current Irm is reversed by the controlled oscillator 310 in such a way to discharge the capacitor 302 for decreasing the voltage Vosc. A dead time Td (not shown in the figure) after the falling edge of the control signal Vcl, the oscillator halt unit 505 is activated in response to the assertion of the enable signal En to the high value. The halt signal HA is initially deasserted to the low value by the oscillator halt unit 505, so that the controlled oscillator 310 is left to normally operate, with the charging current Irm that is sink from the capacitor 302 in such a way to decrease the voltage Vosc.

When the voltage Vosc reaches the low threshold Tl, the controlled oscillator 310 deasserts the oscillator state signal OS to the low value, so that the control signal Vch is driven to the low value (high-side transistor 132 turned off) and the control signal Vcl is driven to the high value (low-side transistor 134 activated). Therefore, the current Ir starts to decrease.

At this point, in order to avoid that the high-side transistor 132 performs a hard switching in its next conduction cycle, the oscillator halt unit 505 asserts the halt signal HA to the high value, halting the controlled oscillator 310, which sets the charging current Irm to zero, in such a way that the voltage Vosc remains at the low threshold Tl. Indeed, if the controlled oscillator 310 was not halted, the charging current Irm would have been reversed by the controlled oscillator 310 in such a way to charge the capacitor 302 for increasing the voltage Vosc. As previously described, at the start-up of the converter 100, i.e., as long as the capacitor 144 of the resonant network 110 is not yet charged to about half the input dc voltage Vin, the current Ir decreases (when the control signal Vcl is at the high value) with a rate that is lower than the rate which the current Ir increases with (when the control signal Vch is at the high value). Thus, by letting the controlled oscillator 310 normally operate in such a way to increase the voltage Vosc, the current Ir would not have the time for becoming negative before the voltage Vosc reached the high threshold Th. In this way, the high-side transistor 132 would perform a hard switching, with the current Ir still positive. This drawback is avoided thanks to the presence of the oscillator halt unit 505, which halts the controlled oscillator 310, and "freezes" the voltage Vosc at the low threshold Tl until the current Ir reaches a negative value (assessable through the direction signal CD). At this point, the controlled oscillator 310 is restarted by the halt unit 505 (halt signal HA deasserted to the low value), and the capacitor 302 is charged again by the charging current Irm. In this way, it is assured that when the voltage Vosc reaches the high threshold value Th, the current Ir is negative. Thus, the high-side transistor 132 turns on (oscillator state signal OS and control signal Vch to the high value) without having to perform a hard switching.

When the voltage Vosc reaches again the high threshold Th, the controlled oscillator 310 deasserts the oscillator state signal OS to the high value, so that the control signal Vch is driven to the high value (high-side transistor 132 activated) and the control signal Vcl is driven to the low value (low-side transistor 134 turned off). Therefore, the current Ir starts to increase.

At this point, in order to avoid that the low-side transistor 134 performs a hard switching in its next conduction cycle, the oscillator halt unit 505 asserts the halt signal HA to the high value, halting the controlled oscillator 310, which sets the charging current Irm to zero, in such a way that the voltage Vosc remains at the high threshold Th. Indeed, if the controlled oscillator 310 was not halted, the charging current Irm would have been reversed by the controlled oscillator 310 in such a way to discharge the capacitor 302 for decreasing the voltage Vosc. By letting the controlled oscillator 310 normally operate in such a way to decrease the voltage Vosc, the current Ir would not have the time for becoming positive before the voltage Vosc reached the low threshold Tl. In this way, the low-side transistor 134 would perform a hard switching, with the current Ir still negative. Again, this drawback is avoided thanks to the presence of the oscillator halt unit 505, which halts the controlled oscillator 310, and "freezes" the voltage Vosc at the high threshold Th until the current Ir reaches a positive value. At this point, the controlled oscillator 310 is restarted by the halt unit 505 (halt signal HA deasserted to the low value), and the capacitor 302 is discharged again by the charging current Irm. In this way, it is assured that when the voltage Vosc reaches the low threshold value Tl, the current Ir is positive. Thus, the low-side transistor 134 turns on (oscillator state signal OS and control signal Vcl to the high value) without having to perform a hard switching.

Therefore, in the solution according to an embodiment of the present disclosure, as long as the enable signal EN is asserted to the high value (briefly referred to as "synchronous condition"):

when the voltage Vosc reaches the low threshold Tl (oscillator state signal OS at the low value), the halt signal HA is kept asserted to the high value for freezing the voltage Vosc at the low threshold Tl and maintaining the control signal Vcl at the high value until the current Ir becomes negative, and when the voltage Vosc reaches the high threshold Th (oscillator state signal OS at the high value), the halt signal HA is kept asserted to the high value for freezing the voltage Vosc at the high threshold Tl and maintaining the control signal Vch at the high value until the current Ir becomes positive.

In other words, in the solution according to an embodiment of the present disclosure the duty cycle of the control signals Vch, Vcl (and, thus, the duty cycle of the square input voltage Vsq at the circuit node 138 of the converter 100) are dynamically varied in such a way to avoid that the high-side transistor 132 switches when the current Ir is positive and the low-side transistor 134 switches when the current Ir is negative.

It has to be appreciated that the oscillator halt unit 505 is enabled (i.e., the enable signal EN is asserted) only once the current Ir has reached a value that is undoubtedly different than zero, i.e., after that the voltage Vosc has reached the high threshold Th. In other words, the current Ir is initially left to oscillate in an asymmetric way, causing an hard switching (particularly, when the low side transistor 134 switches for the first time). However, this first hard switching is required to allow the oscillator unit 310 to correctly operate during the first instants of the converter 100 operation after the power on thereof.

When the enable signal EN is set to the low value after the predetermined time period T, the oscillator halt unit 505 is disabled, and the halt signal HA is permanently set to the low value. In this condition, the controlled oscillator 310 operates normally, with the control signals Vch, Vcl that oscillates with fixed duty cycles. The predetermined time period T is set sufficiently long to ensure that the capacitor 144 of the resonant network 110 has been charged at about half the input dc voltage Vin and, consequently, the current Ir in the resonant network 110 oscillates in a symmetric way around zero.

According to an embodiment of the present disclosure, the transition from the synchronous condition to the normal operation (i.e., after the time period T has been elapsed) is smoothed by increasing the amplitude of the charging current Irm when operating in the synchronous condition. For example, the controlled oscillator 310 may be coupled with the latch 525 for receiving the enable signal EN, in such a way that the value of the charging current Irm is increased (e.g., doubled) by the controlled oscillator 310 when the oscillator halt unit 505 is enabled (enable signal EN at the high value).

Figure 7:
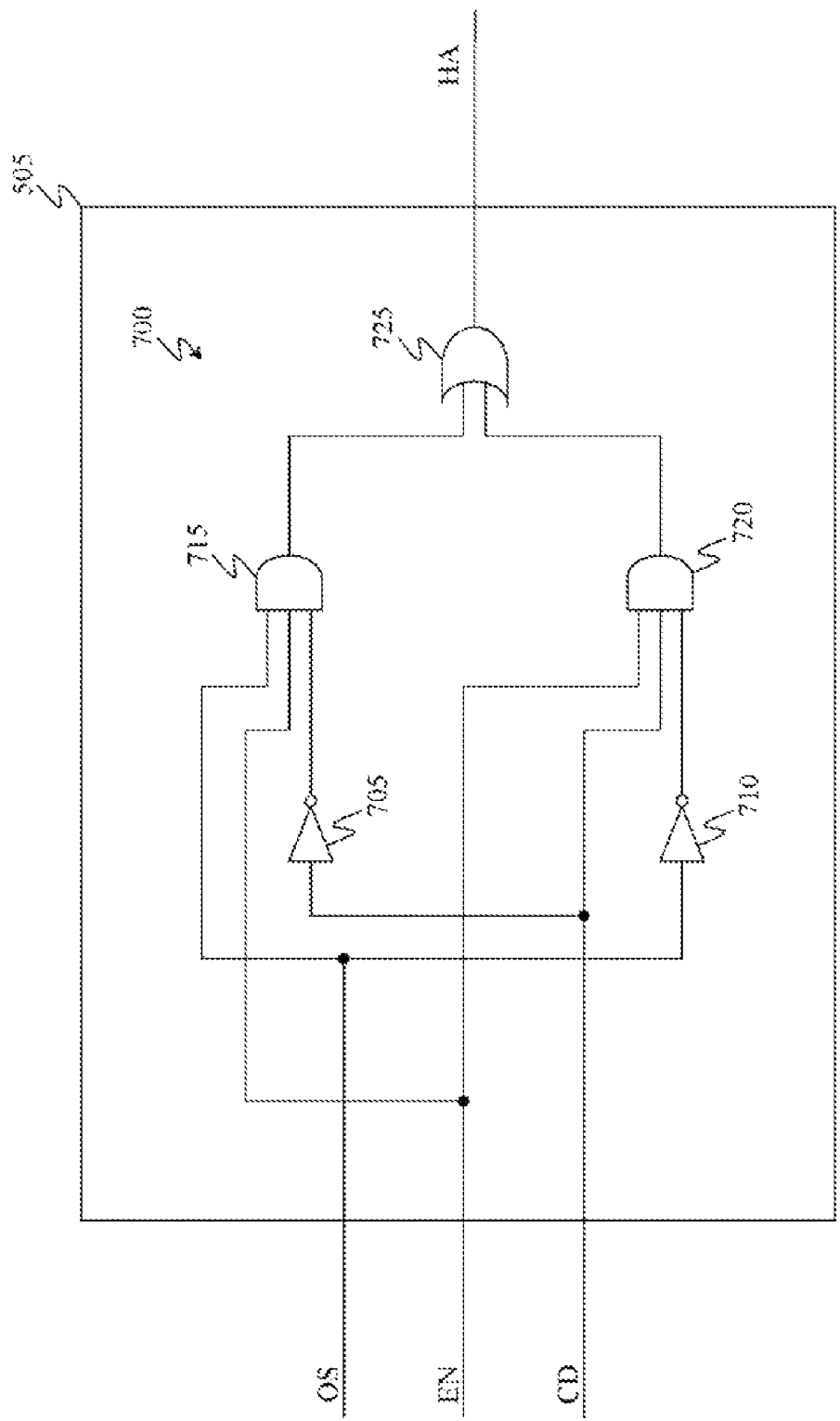
FIG. 7 illustrates an exemplary circuital implementation of the oscillator halt unit included in the switching control circuit of FIG. 5 according to an embodiment of the present disclosure.

FIG. 7 illustrates an exemplary circuital implementation of the oscillator halt unit 505 according to an embodiment of the present disclosure.

Particularly, according to this embodiment the oscillator halt unit 505 includes a combinational circuit 700 comprising two NOT logic gates 705, 710, two AND logic gates 715, 720 and one OR logic gate 725.

In greater detail, the NOT logic gate 705 has an input terminal receiving the direction signal CD and an output terminal connected to a first input terminal of the AND logic gate 715. The AND logic gate 715 further includes a second input terminal receiving the enable signal EN, a third input terminal receiving the oscillator state signal OS and an output terminal connected to a first input terminal of the OR logic gate 725. The NOT logic gate 710 has an input terminal receiving the oscillator state signal OS and an output terminal connected to a first input terminal of the AND logic gate 720. The AND logic gate 720 further includes a second input terminal receiving the direction signal CD, a third input terminal receiving the enable signal EN and an output terminal connected to a second input terminal of the OR logic gate 725. The OR logic gate 725 has an output terminal for providing the halt signal HA.

In this way, the halt signal HA is asserted to the high value (HA=1) for halting the controlled oscillator 310 if the triplet of the values assumed by the enable signal EN, the oscillator state signal OS and the direction signal CD is equal to:

EN=1, OS=1, CD=0, or
EN=1, OS=0, CD=1.

The first triplet of values corresponds to a condition in which the voltage Vosc has been frozen to the high threshold Th (OS=1), and the current Ir is negative (CD=0). According to what has been previously described, said condition is maintained until the current Ir become positive (CD=1). Since the oscillator state signal OS is at the high value (OS=1), when the direction signal CD assumes the high value (CD=1) the oscillator halt unit 505 deasserts the halt signal HA to the low value (HA=0).

The second triplet of values corresponds to the symmetrical condition, in which the voltage Vosc has been frozen to the low threshold Tl (OS=0), and the current Ir is positive (CD=1). Said condition is maintained until the current Ir become negative (CD=0). Since the oscillator state signal OS is at the low value (OS=0), when the direction signal CD assumes the low value (CD=0) the oscillator halt unit 505 deasserts the halt signal HA to the low value (HA=0).

Naturally, in order to satisfy local and specific requirements, a person skilled in the art may apply to the solution described above many logical and/or physical modifications and alterations. More specifically, although the present disclosure has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the disclosure may be incorporated in any other embodiment as a matter of general design choice.

For example, similar considerations apply if the square wave generator 105 has a full-bridge architecture, and/or if the oscillator halt unit 505 has a different structure, being implemented with a circuit different than the combinational circuit 700, but capable of generating the halt signal HA in an equivalent manner.

Moreover, even if according to the present description the control signal Vch is set to the high value when the voltage Vosc reaches the high threshold Th and the control signal Vcl is set to the high value when the voltage Vosc reaches the low threshold Tl, the concepts of the present disclosure can be also applied in the opposite case, wherein the control signal Vch is set to the high value when the voltage Vosc reaches the low threshold Tl and the control signal Vcl is set to the high value when the voltage Vosc reaches the high threshold Th. In this case, the oscillator halt unit 505 halts the controlled oscillator 310 when the voltage Vosc is at the high threshold Th (OS=1) and the current Ir is positive (CD=1), and when the voltage Vosc is at the low threshold Tl (OS=0) and the current Ir is negative (CD=0).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A resonant dc-dc converter for converting an input dc voltage to an output dc voltage, the converter comprising:
   a switching circuit configured to receive the input dc voltage and generate a periodic square wave voltage oscillating between a high value corresponding to the input dc voltage and a low value corresponding to a fixed voltage, the square wave voltage oscillating at a main frequency with a main duty cycle;
   a switching driving circuit configured to drive the switching circuit, the switching driving circuit including a timing circuit configured to set the main frequency and the main duty cycle of the square wave voltage, the timing circuit being configured to set the value of the main duty cycle to about 50% when the converter operates in steady state;

a conversion circuit configured to generate the output dc voltage from the square wave voltage based on the main frequency and on the main duty cycle, wherein the switching circuit is configured to produce a resonant current flowing from an output node of the switching circuit to the conversion circuit;

a sense circuit configured to produce a direction signal that changes value in response to detecting that the resonant current has changed direction; and a disabling circuit configured to temporarily halt the timing circuit after a power on of the converter in such a way to temporarily vary the main duty cycle of the square wave voltage during at least one period of the square wave voltage, wherein the disabling circuit is coupled to the sense circuit and is configured to re-start the timing circuit in response to the direction signal indicating that the resonant current has changed direction.

2. The converter of claim 1, wherein:
the switching circuit includes a first controlled switch coupled between first terminal configured to provide the input dc voltage and a circuit node coupled with the conversion circuit, and a second controlled switch coupled between the circuit node and a second terminal configured to provide the reference voltage, and
the switching driving circuit includes means for alternatively activating the first controlled switch and the second controlled switch in such a way that the square wave is sourced to the circuit node by the switching circuit.

3. The converter of claim 2, wherein:
the switching driving circuit comprises means for generating a first control signal periodically oscillating between a first high value and a first low value at the main frequency with the main duty cycle;
the switching driving circuit comprises means for generating a second control signal periodically oscillating between a second high value and a second low value at the main frequency with a secondary duty cycle, the first and the second control signals being in antiphase;
the first controlled switch is configured to be activated when the first control signal is at the first high value and turned off when the first control signal is at the first low value, and
the second controlled switch is configured to be activated when the second control signal is at the second high value and turned off when the second control signal is at the second low value.

4. The converter of claim 3, wherein the timing circuit comprises a reference capacitor, the main duty cycle and the secondary duty cycle depending on a reference voltage that develops across the reference capacitor.

5. The converter of claim 4, wherein the switching driving circuit comprises:
means for setting the first control signal to the first high value when the reference voltage reaches a high threshold, and
means for setting the second control signal to the second high value when the reference voltage reaches a low threshold.

6. The converter of claim 4, wherein the switching driving circuit comprises:
means for setting the first control signal to the first high value when the reference voltage reaches a low threshold, and
means for setting the second control signal to the second high value when the reference voltage reaches a high threshold.

7. The converter of claim 4, wherein:
the timing circuit further comprises an oscillator circuit configured to provide to the reference capacitor an oscillator current oscillating between a positive value for charging the reference capacitor and a negative value for discharging the reference capacitor, the main duty cycle being in inverse proportion to values of the oscillator current that discharge the reference capacitor and the secondary duty cycle being in inverse proportion to values of the oscillator current that charge the reference capacitor, and
the disabling circuit includes a halt unit configured to control the oscillator circuit and temporarily reset the oscillator current to zero based on the value of the resonant current.

8. The converter of claim 7, wherein:
the switching driving circuit comprises:
means for setting the first control signal to the first high value when the reference voltage reaches a high threshold, and
means for setting the second control signal to the second high value when the reference voltage reaches a low threshold; and
the halt unit further comprises:
means for resetting the oscillator current to zero and maintaining said oscillator current at zero as long as the reference voltage is at the high threshold and the resonant current has a negative value, and
means for resetting the oscillator current to zero and maintaining said oscillator current at zero as long as the reference voltage is at the low threshold and the resonant current has a positive value.

9. The converter of claim 7, wherein:
the switching driving circuit comprises:
means for setting the first control signal to the first high value when the reference voltage reaches a low threshold, and
means for setting the second control signal to the second high value when the reference voltage reaches a high threshold; and
the halt unit further comprises:
means for resetting the oscillator current to zero and maintaining said oscillator current at zero as long as the reference voltage is at the high threshold and the resonant current has a positive value, and
means for resetting the oscillator current to zero and maintaining said oscillator current at zero as long as the reference voltage is at the low threshold and the resonant current has a negative value.

10. The converter of claim 7, wherein the driving circuit includes means for increasing the amplitude of the oscillator current during said at least one period of the square wave voltage.

11. A square wave generator, comprising:
a switching circuit configured to receive an input dc voltage and generate a periodic square wave voltage oscillating between a high value corresponding to the input dc voltage and a low value corresponding to a fixed voltage, the square wave voltage oscillating at a main frequency with a main duty cycle, wherein the switching circuit is configured to produce a resonant current flowing from an output node of the switching circuit;
a sense circuit configured to produce a direction signal that changes value in response to detecting that the resonant current has changed direction;
a switching driving circuit configured to drive the switching circuit, the switching driving circuit including a timing circuit configured to set the main frequency and the main duty cycle of the square wave voltage, the timing circuit being configured to set the value of the main duty cycle to about 50% when operating in steady state; and a disabling circuit configured to temporarily halt the timing circuit after a power on of the square wave generator in such a way to temporarily vary the main duty cycle of the square wave voltage during at least one period of the square wave voltage, wherein the disabling circuit is coupled to the sense circuit and is configured to re-start the timing circuit in response to the direction signal indicating that the resonant current has changed direction.

12. The square wave generator of claim 11, wherein:

the switching circuit includes a first controlled switch coupled between first terminal configured to provide the input dc voltage and a circuit node coupled with the conversion circuit, and a second controlled switch coupled between the circuit node and a second terminal configured to provide the reference voltage, and the switching driving circuit includes means for alternatively activating the first controlled switch and the second controlled switch in such a way that the square wave is sourced to the circuit node by the switching circuit.

13. The square wave generator of claim 12, wherein:

the switching driving circuit comprises means for generating a first control signal periodically oscillating between a first high value and a first low value at the main frequency with the main duty cycle;

the switching driving circuit comprises means for generating a second control signal periodically oscillating between a second high value and a second low value at the main frequency with a secondary duty cycle, the first and the second control signals being in antiphase;

the first controlled switch is configured to be activated when the first control signal is at the first high value and turned off when the first control signal is at the first low value, and the second controlled switch is configured to be activated when the second control signal is at the second high value and turned off when the second control signal is at the second low value.

14. The square wave generator of claim 12, wherein:

the switching driving circuit comprises means for generating a first control signal periodically oscillating between a first high value and a first low value at the main frequency with the main duty cycle;

the switching driving circuit comprises means for generating a second control signal periodically oscillating between a second high value and a second low value at the main frequency with a secondary duty cycle, the first and the second control signals being in antiphase;

the timing circuit comprises a reference capacitor, the main duty cycle and the secondary duty cycle depending on a reference voltage that develops across the reference capacitor.

15. The square wave generator of claim 14, wherein the switching driving circuit comprises:

means for activating the first controlled switch when the reference voltage reaches a high threshold, and means for activating the second controlled switch when the reference voltage reaches a low threshold.

16. The square wave generator of claim 14, wherein the switching driving circuit comprises:

means for activating the first controlled switch when the reference voltage reaches a low threshold, and means for activating the second controlled switch when the reference voltage reaches a high threshold.

17. The square wave generator of claim 14, wherein:

the timing circuit further comprises an oscillator circuit configured to provide to the reference capacitor an oscillator current oscillating between a positive value for charging the reference capacitor and a negative value for discharging the reference capacitor, the main duty cycle being in inverse proportion to values of the oscillator current that discharge the reference capacitor and the secondary duty cycle being in inverse proportion to values of the oscillator current that charge the reference capacitor, and the disabling circuit includes a halt unit configured to control the oscillator circuit and temporarily reset the oscillator current to zero based on the value of the resonant current.

18. The square wave generator of claim 17, wherein:

the switching driving circuit comprises:

means for activating the first controlled switch when the reference voltage reaches a high threshold, and means for activating the second controlled switch when the reference voltage reaches a low threshold; and the halt unit further comprises:

means for resetting the oscillator current to zero and maintaining said oscillator current at zero as long as the reference voltage is at the high threshold and the resonant current has a negative value, and means for resetting the oscillator current to zero and maintaining said oscillator current at zero as long as the reference voltage is at the low threshold and the resonant current has a positive value.

19. The square wave generator of claim 17, wherein:

the switching driving circuit comprises:

means for activating the first controlled switch when the reference voltage reaches a low threshold, and means for activating the second controlled switch when the reference voltage reaches a high threshold; and the halt unit further comprises:

means for resetting the oscillator current to zero and maintaining said oscillator current at zero as long as the reference voltage is at the high threshold and the resonant current has a positive value, and means for resetting the oscillator current to zero and maintaining said oscillator current at zero as long as the reference voltage is at the low threshold and the resonant current has a negative value.

20. The square wave generator of claim 17, wherein the driving circuit includes means for increasing the amplitude of the oscillator current during said at least one period of the square wave voltage.

21. A method, comprising:

operating a resonant dc-dc converter configured to convert an input dc voltage to an output dc voltage, the operating including:

generating a periodic square wave voltage oscillating from a high value corresponding to the input dc voltage to a low value corresponding to a fixed voltage, the square wave voltage oscillating at a main frequency with a main duty cycle, the value of the main duty cycle being equal to about 50% when the converter operates in a steady state;

producing a resonant current;

generating the output dc voltage from the square wave voltage and the resonant current based on the main frequency and on the main duty cycle by exploiting a conversion circuit based on a resonant circuit;

producing a direction signal that changes value in response to detecting that the resonant current has changed direction; and temporarily varying the main duty cycle of the square wave voltage during at least one period of the square wave voltage after a power on of the converter, wherein:

generating the periodic square wave voltage uses a timing circuit;

temporarily varying the main duty cycle includes temporarily halting the timing circuit during the at least one period of the square wave voltage; and re-starting the timing circuit in response to the direction signal indicating that the resonant current has changed direction.

22. The method of claim 21, wherein:

the converter includes a first controlled switch coupled between first terminal configured to provide the input dc voltage and a circuit node, and a second controlled switch coupled between the circuit node and a second terminal configured to provide a reference voltage.

23. The method of claim 21, further comprising:

generating a first control signal periodically oscillating between a first high value and a first low value at the main frequency with the main duty cycle;

generating a second control signal periodically oscillating between a second high value and a second low value at the main frequency with a secondary duty cycle, the first and the second control signals being in antiphase;

activating the first controlled switch when the first control signal is at the first high value and turning off the first controlled switch when the first control signal is at the first low value, and activating the second controlled switch when the second control signal is at the second high value and turning off the second controlled switch when the second control signal is at the second low value.

24. The method of claim 22, further comprising:

generating a first control signal periodically oscillating between a first high value and a first low value at the main frequency with the main duty cycle;

generating a second control signal periodically oscillating between a second high value and a second low value at the main frequency with a secondary duty cycle, the first and the second control signals being in antiphase, wherein the main duty cycle and the secondary duty cycle depend on a reference voltage that develops across a reference capacitor.

25. The method of claim 24, further comprising:

activating the first controlled switch in response to the reference voltage reaching a high threshold, and activating the second controlled switch in response to the reference voltage reaching a low threshold.

26. The method of claim 24, further comprising:

activating the first controlled switch in response to the reference voltage reaching a low threshold, and activating the second controlled switch in response to the reference voltage reaching a high threshold.

27. The method of claim 24, wherein:

providing to the reference capacitor an oscillating current that oscillates between a positive value for charging the reference capacitor and a negative value for discharging the reference capacitor, the main duty cycle being in inverse proportion to values of the oscillating current that discharge the reference capacitor and the secondary duty cycle being in inverse proportion to values of the oscillating current that charge the reference capacitor, and temporarily varying the main duty cycle includes temporarily halting the timing circuit during the at least one period of the square wave voltage by temporarily resetting the oscillating current to zero based on the value of the resonant current.

28. The method of claim 27, further comprising:

setting the first control signal to the first high value when the reference voltage reaches a high threshold, setting the second control signal to the second high value when the reference voltage reaches a low threshold, wherein temporarily varying the main duty cycle includes:

resetting the oscillating current to zero and maintaining said oscillating current at zero as long as the reference voltage is at the high threshold and the resonant current has a negative value, and resetting the oscillating current to zero and maintaining said oscillating current at zero as long as the reference voltage is at the low threshold and the resonant current has a positive value.

29. The method of claim 27, further comprising:

setting the first control signal to the first high value when the reference voltage reaches a low threshold, and setting the second control signal to the second high value when the reference voltage reaches a high threshold, wherein temporarily varying the main duty cycle includes:

resetting the oscillating current to zero and maintaining said oscillating current at zero as long as the reference voltage is at the high threshold and the resonant current has a positive value, and resetting the oscillating current to zero and maintaining said oscillating current at zero as long as the reference voltage is at the low threshold and the resonant current has a negative value.

30. The method of claim 27, comprising increasing the amplitude of the oscillating current during said at least one period of the square wave voltage.

31. A resonant dc-dc converter for converting an input dc voltage to an output dc voltage, the converter comprising:

a switching circuit configured to receive the input dc voltage and generate a periodic square wave voltage oscillating between a high value corresponding to the input dc voltage and a low value corresponding to a fixed voltage, the square wave voltage oscillating at a main frequency with a main duty cycle;

a switching driving circuit configured to drive the switching circuit, the switching driving circuit including a timing circuit configured to set the main frequency and the main duty cycle of the square wave voltage, the timing circuit being configured to set the value of the main duty cycle to about 50% when the converter operates in steady state;

a conversion circuit configured to generate the output dc voltage from the square wave voltage based on the main frequency and on the main duty cycle; and a disabling circuit configured to temporarily halt the timing circuit after a power on of the converter in such a way to temporarily vary the main duty cycle of the square wave voltage during at least one period of the square wave voltage, wherein:

the switching circuit includes a first controlled switch coupled between first terminal configured to provide the input dc voltage and a circuit node coupled with the conversion circuit, and a second controlled switch coupled between the circuit node and a second terminal configured to provide the reference voltage;

the switching driving circuit includes means for alternatively activating the first controlled switch and the second controlled switch in such a way that the square wave is sourced to the circuit node by the switching circuit;

the switching driving circuit comprises means for generating a first control signal periodically oscillating between a first high value and a first low value at the main frequency with the main duty cycle;

the switching driving circuit comprises means for generating a second control signal periodically oscillating between a second high value and a second low value at the main frequency with a secondary duty cycle, the first and the second control signals being in antiphase;

the first controlled switch is configured to be activated when the first control signal is at the first high value and turned off when the first control signal is at the first low value;

the second controlled switch is configured to be activated when the second control signal is at the second high value and turned off when the second control signal is at the second low value;

the timing circuit comprises a reference capacitor, the main duty cycle and the secondary duty cycle depending on a reference voltage that develops across the reference capacitor;

the timing circuit further comprises an oscillator circuit configured to provide to the reference capacitor an oscillator current oscillating between a positive value for charging the reference capacitor and a negative value for discharging the reference capacitor, the main duty cycle being in inverse proportion to values of the oscillator current that discharge the reference capacitor and the secondary duty cycle being in inverse proportion to values of the oscillator current that charge the reference capacitor; and the disabling circuit includes a halt unit configured to temporarily halt the timing circuit based on a value of a resonant current flowing from the circuit node toward the conversion circuit, control the oscillator circuit, temporarily reset the oscillator current to zero based on the value of the resonant current.

32. The converter of claim 31, wherein the switching driving circuit comprises:
means for setting the first control signal to the first high value when the reference voltage reaches a high threshold, and
means for setting the second control signal to the second high value when the reference voltage reaches a low threshold.

33. The converter of claim 32, wherein the switching driving circuit comprises:
means for setting the first control signal to the first high value when the reference voltage reaches a low threshold, and
means for setting the second control signal to the second high value when the reference voltage reaches a high threshold.

34. A square wave generator, comprising:
a switching circuit configured to receive an input dc voltage and generate a periodic square wave voltage oscillating between a high value corresponding to the input dc voltage and a low value corresponding to a fixed voltage, the square wave voltage oscillating at a main frequency with a main duty cycle;

a switching driving circuit configured to drive the switching circuit, the switching driving circuit including a timing circuit configured to set the main frequency and the main duty cycle of the square wave voltage, the timing circuit being configured to set the value of the main duty cycle to about 50% when the converter operates in steady state; and a disabling circuit configured to temporarily halt the timing circuit after a power on of the square wave generator in such a way to temporarily vary the main duty cycle of the square wave voltage during at least one period of the square wave voltage, wherein:

the switching circuit includes a first controlled switch coupled between first terminal configured to provide the input dc voltage and a circuit node coupled with the conversion circuit, and a second controlled switch coupled between the circuit node and a second terminal configured to provide the reference voltage;

the switching driving circuit includes means for alternatively activating the first controlled switch and the second controlled switch in such a way that the square wave is sourced to the circuit node by the switching circuit;

the switching driving circuit comprises means for generating a first control signal periodically oscillating between a first high value and a first low value at the main frequency with the main duty cycle;

the switching driving circuit comprises means for generating a second control signal periodically oscillating between a second high value and a second low value at the main frequency with a secondary duty cycle, the first and the second control signals being in antiphase;

the timing circuit comprises a reference capacitor, the main duty cycle and the secondary duty cycle depending on a reference voltage that develops across the reference capacitor;

the timing circuit comprises an oscillator circuit configured to provide to the reference capacitor an oscillator current oscillating between a positive value for charging the reference capacitor and a negative value for discharging the reference capacitor, the main duty cycle being in inverse proportion to values of the oscillator current that discharge the reference capacitor and the secondary duty cycle being in inverse proportion to values of the oscillator current that charge the reference capacitor; and the disabling circuit includes a halt unit configured temporarily halt the timing circuit based on a value of a resonant current flowing from the circuit node, control the oscillator circuit, and temporarily reset the oscillator current to zero based on the value of the resonant current.

35. The square wave generator of claim 34, wherein the switching driving circuit comprises:
means for activating the first controlled switch when the reference voltage reaches a high threshold, and
means for activating the second controlled switch when the reference voltage reaches a low threshold.

36. The square wave generator of claim 34, wherein the switching driving circuit comprises:
means for activating the first controlled switch when the reference voltage reaches a low threshold, and
means for activating the second controlled switch when the reference voltage reaches a high threshold.

37. A method, comprising:

operating a resonant dc-dc converter configured to convert an input dc voltage to an output dc voltage, the operating including:

generating a periodic square wave voltage oscillating from a high value corresponding to the input dc voltage to a low value corresponding to a fixed voltage, the square wave voltage oscillating at a main frequency with a main duty cycle, the value of the main duty cycle being equal to about 50% when the converter operates in a steady state;

generating the output dc voltage from the square wave voltage based on the main frequency and on the main duty cycle by exploiting a conversion circuit based on a resonant circuit, temporarily varying the main duty cycle of the square wave voltage during at least one period of the square wave voltage after a power on of the converter, wherein:

generating the periodic square wave voltage uses a timing circuit; and temporarily varying the main duty cycle includes temporarily halting the timing circuit during the at least one period of the square wave voltage;

the converter includes a first controlled switch coupled between first terminal configured to provide the input dc voltage and a circuit node, and a second controlled switch coupled between the circuit node and a second terminal configured to provide a reference voltage; and temporarily halting the timing circuit includes temporarily halting the timing circuit based on a value of a resonant current flowing from the circuit node;

generating a first control signal periodically oscillating between a first high value and a first low value at the main frequency with the main duty cycle;

generating a second control signal periodically oscillating between a second high value and a second low value at the main frequency with a secondary duty cycle, the first and the second control signals being in antiphase, wherein the main duty cycle and the secondary duty cycle depend on a reference voltage that develops across a reference capacitor, wherein:

providing to the reference capacitor an oscillating current that oscillates between a positive value for charging the reference capacitor and a negative value for discharging the reference capacitor, the main duty cycle being in inverse proportion to values of the oscillating current that discharge the reference capacitor and the secondary duty cycle being in inverse proportion to values of the oscillating current that charge the reference capacitor, and temporarily varying the main duty cycle includes temporarily halting the timing circuit during the at least one period of the square wave voltage by temporarily resetting the oscillating current to zero based on the value of the resonant current.

38. The method of claim 37, further comprising:

activating the first controlled switch in response to the reference voltage reaching a high threshold, and activating the second controlled switch in response to the reference voltage reaching a low threshold.

39. The method of claim 37, further comprising:

activating the first controlled switch in response to the reference voltage reaching a low threshold, and activating the second controlled switch in response to the reference voltage reaching a high threshold.

* * * * *